US007558848B1

(12) United States Patent
Shokhor

(10) Patent No.: US 7,558,848 B1
(45) Date of Patent: Jul. 7, 2009

(54) SYSTEM AND METHOD FOR DETERMINING INTEGRITY OVER A VIRTUAL PRIVATE NETWORK TUNNEL

(75) Inventor: Sergey Shokhor, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 1026 days.

(21) Appl. No.: 10/788,939

(22) Filed: Feb. 27, 2004

(51) Int. Cl.
  *G06F 15/173* (2006.01)
(52) U.S. Cl. .................. 709/223; 709/224; 709/217; 709/219
(58) Field of Classification Search ............. 709/223, 709/224, 229, 219; 726/1
  See application file for complete search history.

(56) References Cited

U.S. PATENT DOCUMENTS 6,973,305 B2 * 12/2005 McLean .................. 455/425
2003/0055994 A1 * 3/2003 Herrmann et al. .......... 709/229
2003/0177389 A1 * 9/2003 Albert et al. ............... 713/201

* cited by examiner

*Primary Examiner*—Frantz B Jean
(74) *Attorney, Agent, or Firm*—Darby & Darby P.C.; Jamie L. Wiegand

(57) ABSTRACT

An apparatus and method are directed to managing a policy-based access to a resource employing dynamic client integrity checking. The system may include a client device configured to log into a server. The server may provide a component to the client device. The component is configured to provide integrity information about the client device back to the server. The component may provide updates to the integrity information at a pre-determined schedule, thereby monitoring changes to the integrity of the client device during a connected session. Based, in part, on the received integrity information a policy for access is applied to the client device. In one embodiment, access may be increased to the resource. In another embodiment, the policy may deny access to the resource, if it is determined that the client device has an enabled network sniffer, an improperly configured antivirus application, or the like.

30 Claims, 4 Drawing Sheets

SYSTEM AND METHOD FOR DETERMINING INTEGRITY OVER A VIRTUAL PRIVATE NETWORK TUNNEL

FIELD OF THE INVENTION

The invention relates generally to integrity of a computing device, and more particularly, but not exclusively, to determining the integrity of a computing device over a virtual private network tunnel.

BACKGROUND OF THE INVENTION

As the Internet becomes an important method for organizations to provide access to mission critical applications, security becomes a larger and more prevalent issue of concern. Often an organization may deploy security mechanisms that enable remote access while maintaining a level of authentication and authorization to those resources. For example, many organizations employ IPSec virtual private networks (VPNs) to provide employees with remote access to the organization's resources. Employees are often allowed to obtain access to important resources from a variety of computing devices, including kiosks, mobile devices, and home computers, as well as computing devices provided and maintained by the organization.

However, use of computing devices that are not maintained by the organization may still result in increased security risks. For example, such computing devices may be inadequately configured with the security components that an organization may demand. As such, although the end-user may be sufficiently authenticated for access, the computing device employed to obtain that access may be inadequate. Requiring that every employee use only those computing devices that are issued and maintained by the organization, however, is often both impractical and costly. Thus, there is a need in the industry to better secure enterprise resources accessed by remote computing devices. Therefore, it is with respect to these considerations and others that the invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE PREFERRED EMBODIMENT

Figure 1:
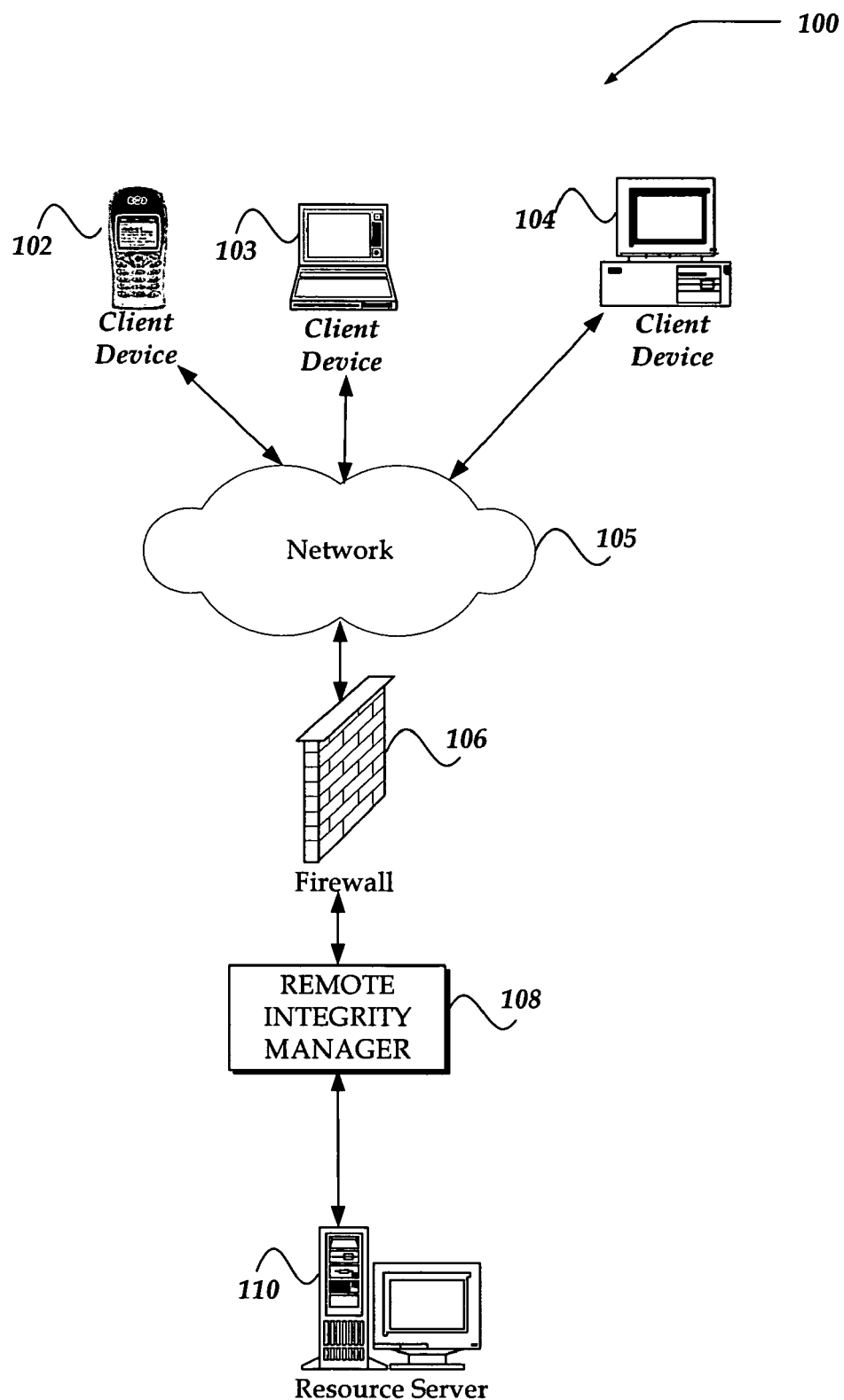
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

Briefly stated, the invention is directed towards a system, apparatus, and method for managing a policy-based access to an enterprise resource employing dynamic client integrity checking. The policy may be managed by a System Administrator, or the like, to enable quick and effective control over the enterprise network resource. In one embodiment of the invention, a client device is configured to log into a server. The server may provide a component, such as a program, control, script, or the like to the client device. The component is configured to perform an inspection of the client device and provide integrity information back to the server. Based, in part, on the received integrity information a policy for access is applied to the client device. In one embodiment, the policy may increase access to the resource, based on improved integrity information, or the like. In another embodiment, the policy may deny access to the resource if it is determined that the client device has an enabled network sniffer, an improperly configured antivirus application, and the like. Unlike traditional integrity checkers that may perform a single check at the start of a session, the invention provides updates to the integrity information at a pre-determined schedule. Thus, the invention may monitor changes to the integrity of the client device and provide an appropriate response based, in part, on the changes over time. For example, if a specified file, such as a routing table, or the like, changes, the policy may be to terminate access to the resource.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, firewall 106, remote integrity manager (RIM) 108, and resource server 110. Network 105 enables communication between client devices 102-104, and firewall 106. RIM 108 is in communication with firewall 106 and resource server 110. Although not shown, resource server 110 typically resides within an enterprise's intranet, while firewall 106 and RIM 108 may reside within an enterprise's demilitarized zone (DMZ).

Generally, client devices 102-104 may include virtually any computing device capable of connecting to another computing device to send and receive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 102-104 may be any device that is capable of connecting using a wired or wireless communication medium such as a PDA, POCKET PC, wearable computer, and any other device that is equipped to communicate over a wired and/or wireless communication medium.

Client devices 102-104 may be configured as a public system, such as a kiosk, home computing device, personal computing device, personal mobile computing device, and the like, that may be used by an employee, or the like, of the enterprise to access an enterprise resource, such as resource server 110. Such client devices might not be issued or maintained by the enterprise, typically resulting in a classification as an untrusted device.

Similarly, client devices 102-1-4 may be maintained, issued, and configured by a business partner, and the like. These client devices may also be classified as untrusted devices. For example, such client devices might be employed by a non-employee to the enterprise that seeks access to an enterprise resource to share a file, obtain extranet access, and the like.

Client devices 102-104 may also be configured, maintained, and issued by the enterprise to an employee of the enterprise, and the like. Such client devices may be considered to be trusted devices.

Client devices 102-104 typically include a browser application, and the like, that is configured to enable network access through firewall 106 to communicate with RIM 108. Client devices 102-104 may be further configured to enable a secure communication with RIM 108 using such mechanisms as Secure Sockets Layer (SSL), IPSec, Tunnel Layer Security (TLS), and the like. In one embodiment, client devices 102-104 are configured to establish a communication with RIM 108 employing an IPSec VPN.

Client devices 102-104 may further include a client application, and the like, that is configured to manage the actions described above for mobile device 102.

Network 105 is configured to couple client devices 102-104, and the like, with resource server 110 through firewall 106 and RIM 108. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102-104 and firewall 106 to RIM 108, resource server 110, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Firewall 106, which may be an optional component of the invention, may include one or more computing devices configured to shield a resource, such as resource server 110, within a locally managed security perimeter (not shown) from an undesired external access. Firewall 106 may include a filter, gateway, network address translator (NAT), and the like configured to minimize the undesired external accesses. As such firewall 106 may be implemented on a variety of computing devices including personal computers, desktop computers, multiprocessor systems, microprocessor-based devices, network PCs, servers, proxy servers, reverse proxy servers, gateways, network appliances, and the like. In one embodiment, firewall 106 is configured to enable access employing a VPN.

RIM 108 is described in more detail below in conjunction with FIG. 2. Briefly, however, RIM 108 includes virtually any network device configured to enable quick and effective policy based access control over a network resource, such as resource server 110. As such, RIM 108 may be implemented on a variety of network devices including personal computers, desktop computers, multiprocessor systems, microprocessor-based devices, network PCs, servers, proxy servers, reverse proxy servers, gateways, network appliances, and the like.

Through the policy, an administrator, or the like, may authorize access to an application, server, service, and other resources, based, in part, on the integrity of a client device. For example, an access policy may deny a client device access to a requested resource because a key logger has been detected on the client device. Similarly, another access policy may enable access to the requested resource where an appropriate version has been detected of a virus application, firewall application, and the like. In still another example, a change in integrity information of the client device over time may result in a different access policy being applied. For example, the policy may deny access where a particular change has been detected over time to a system file, table, or the like. Similarly, where the integrity of the client device has improved, the policy applied may increase the access to the resource, another resource, or the like. For example, a security configuration associated with the client device may have been increased, resulting in improved integrity for the client device. However, the access policy is not limited to these examples, and virtually any access policy may be employed without departing from the scope of the invention.

RIM 108 may be configured to provide a component, such as an application, java control, program, script, applet, active-X control, and the like, to the client device seeking access to a resource. RIM 108 may be further configured to receive integrity information about the client device from the component. Integrity information may include, but is not limited to whether an antivirus product is enabled, whether a network sniffer, screen scraper, a cracker tool, hacker tool, and the like, is enabled, whether a firewall product is enabled, what security products are enabled, and the like. Integrity information may further include information associated with which processes are currently executing on the client device. Integrity information may also include version information associated with selected applications, processes, an operating system, and the like. Integrity information, however, is not limited to the above, and virtually any information, sequence of events, conditions, and the like, may be collected to determine the integrity of the client device.

Resource server 110 represents virtually any resource service, device, and the like, to which client devices 102-104 may seek access. Such resources may include, but is not limited to, web services, mail services, database services, repositories, legacy services, telnet services, FTP services, and the like. As such resource server 110 may be implemented on a variety of computing devices including personal computers, desktop computers, multiprocessor systems, microprocessor-based devices, network PCs, servers, and the like.

Although illustrated in FIG. 1 as distinct components, firewall 106, RIM 108, and resource server 110 may be arranged, combined, and the like, in any of a variety of ways, without departing from the scope of the invention. For example firewall 106 and RIM 108 may reside in substantially the same network device.

Illustrative Server Environment

Figure 2:
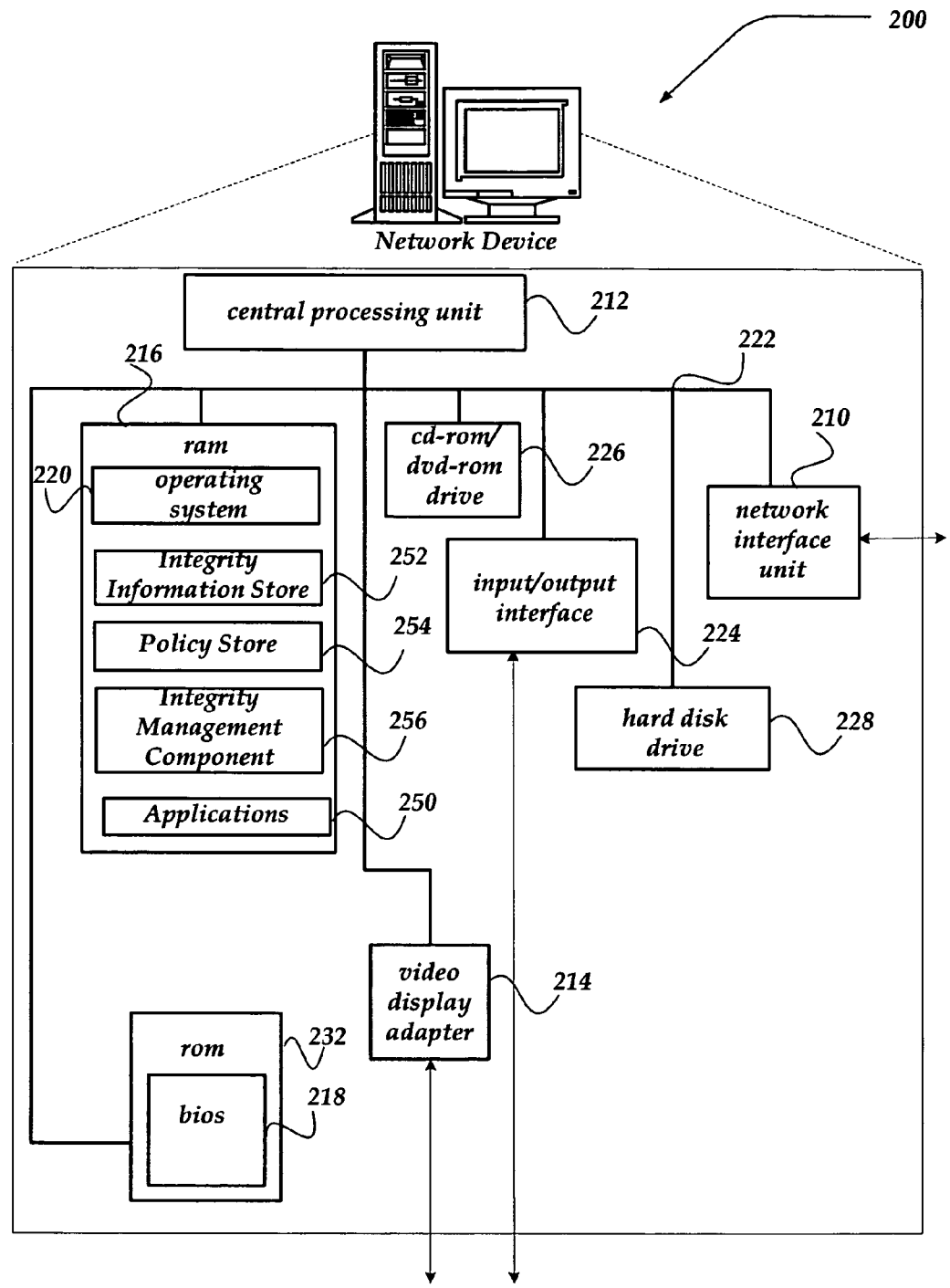
FIG. 2 shows one embodiment of a server device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, RIM 108 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information, which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, security programs, VPN programs, tunneling applications, and so forth. Mass storage may further include applications such as integrity information store (IIS) 252, policy store 254, and integrity management component 256.

Integrity management component 256 is configured to enable administrators, and the like, to provide quick and effective access control over a network resource, such as resource server 110 of FIG. 1, through the use of integrity information obtained from a client device.

Integrity management component 256 may download a component, such as an application, control, script, or the like, onto the client device to obtain integrity information. Integrity management component 256 may receive the integrity information based on a pre-determined schedule. For example, the component may provide initial integrity information, and then provide updates associated with the integrity of the client device at a predetermined rate. In one embodiment, the predetermined rate is approximately every 500 msecs. However, the invention is not so limited. For example, the component may monitor the client device and provide an integrity update to integrity management component 256 based on some condition, event, and the like, that may occur within the client device. For example, a modification to a predetermined file, table, routing table, system file, or the like, may result in an update of the integrity information being provided to integrity management component 256. However, virtually any predetermined event, condition, and the like, may be employed to trigger an update of the integrity information being sent to integrity management component 256.

Integrity management component 256 is not limited to obtaining integrity information about the client device through a downloaded component. Integrity management component 256 may employ virtually any other mechanism to obtain integrity information. For example, integrity management component 256 may be configured to send a query request, and the like, to the client device, for selected information about the integrity of the client device, without departing from the scope of the invention.

Figure 3:
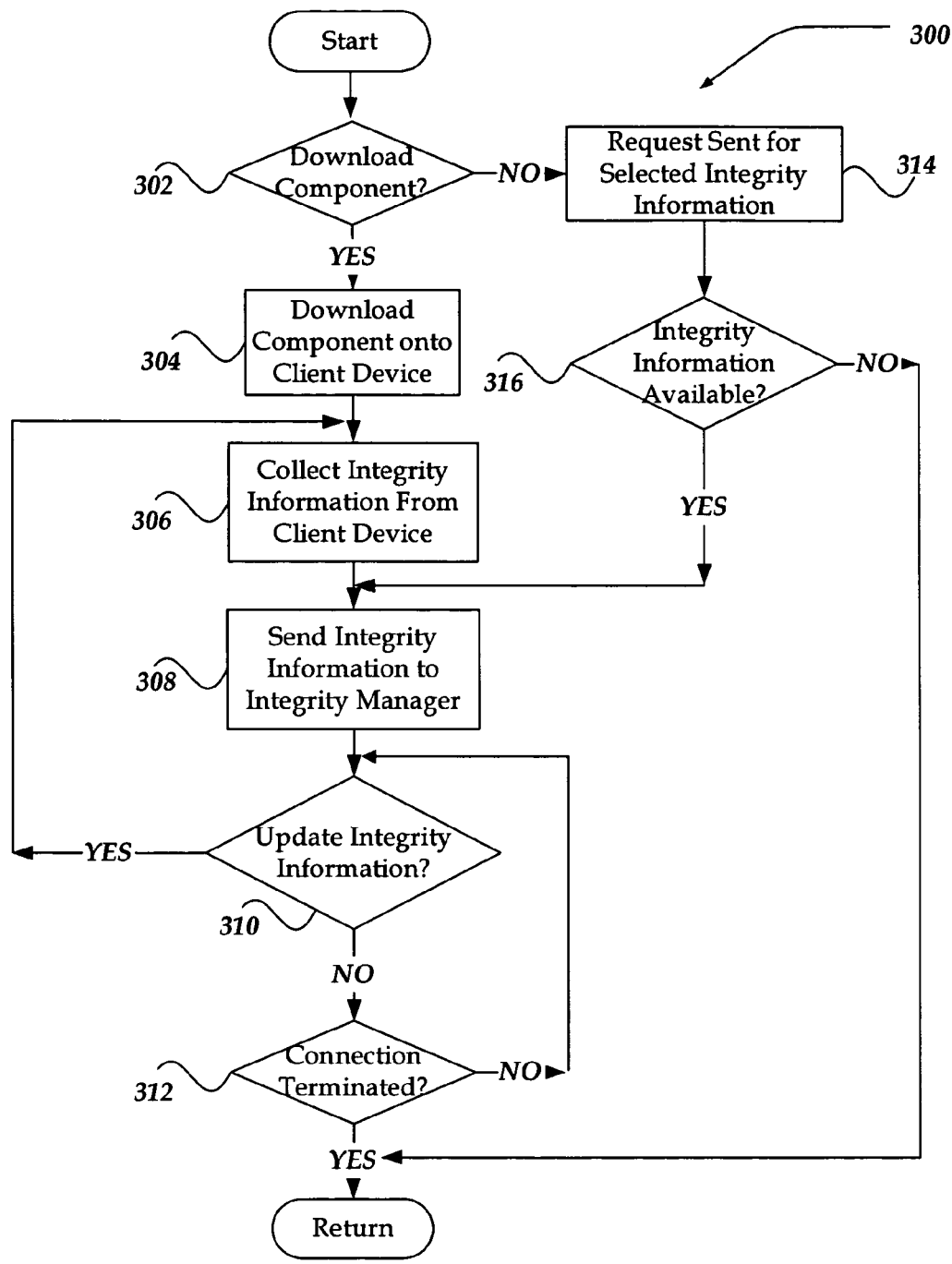
FIG. 3 illustrates a logical flow diagram generally showing one embodiment of a process for dynamically collecting integrity information of a remote device based on a policy.

Integrity management component 256 may also employ the processes illustrated in FIGS. 3-4, and described in more detail below to manage the client device access to the requested resource.

Integrity management component 256 may further include a customizable user interface that enables an administrator, or the like, to adjust an overall look and feel of integrity management component 256, modify the dynamic policies, and the like, within policy store 254, and even to query integrity information within IIS 252.

Policy Store 254 may include text, code, a file, script, database, and the like, that is configured to store dynamic policies, rules, events, conditions, and the like, that may be employed by integrity management component 256 to determine access to the requested resource.

Integrity Information Store (IIS) 252 may include a file, database, directory, folder, and the like, that is configured to maintain received integrity information for the client device. IIS 252 may include integrity information that has been collected over time for a given client device, for a given connection, multiple connections, and the like.

Although illustrated in FIG. 2 as distinct components, IIS 252, policy store 254, and integrity management component 256 may be arranged, combined, and the like, in any of a variety of ways, without departing from the scope of the invention. For example IIS 252, policy store 254, and integrity management component 256 may reside in one or more network devices similar to network device 200.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like. Similarly, network device 200 may include applications that support virtually any tunneling mechanism, including but not limited to VPN, PPP, L2TP, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, files, folders, integrity information, policy information, and the like.

In one embodiment, network device 200 includes one or more Application Specific Integrated Circuit (ASIC) chips (not shown) connected to bus 222.

In one embodiment, network interface unit 210 may connect to the bus through the ASIC chip. The ASIC chip may include logic that performs some of the functions of network device 200. For example, in one embodiment, the ASIC chip performs a number of packet processing functions, to process incoming integrity information, apply a policy based on the integrity information, and based on the policy determine access to a resource, and the like.

In one embodiment, network device 200 includes one or more field-programmable gate arrays (FPGA) (not shown), instead of, or in addition to, the ASIC chip. A number of functions of the network device can be performed by the ASIC chip, by an FPGA, by CPU 212 with the logic of program code stored in mass memory, or by a combination of the ASIC chip and the CPU.

Generalized Operation

The operation of certain aspects of the invention will now be described with respect to FIGS. 3-4. FIG. 3 illustrates a logical flow diagram generally showing one embodiment of a process for dynamically collecting integrity information of a remote device. Process 300 of FIG. 3 may be implemented within RIM 108 of FIG. 1. Process 300 typically is entered when a remote client device such as one of client devices 102-104 of FIG. 1 seeks access to a network resource. In one embodiment, process 300 is entered when a client device 102-104 initiates an SSL VPN connection with a server, such as resource server 110.

Process 300 begins, after a start block, at decision block 302, where a determination is made whether a component, such as a control, application, script, or the like, may be downloaded onto the remote client device. The component may not be downloadable for a variety of reasons, including, the client device is not able to receive and/or execute the component, the client device has been configured to not accept downloads, and the like. In any event, if it is determined that the component may not be downloaded to the client device, processing branches to block 314; otherwise, processing proceeds to block 304, where the component is downloaded onto the client device.

Process 300 proceeds to block 306, where the downloaded component collects information associated with the integrity of the client device. Such information may include whether an antivirus product is enabled, whether a network sniffer, screen scraper, a cracker tool, hacker tool, and the like, is enabled, whether a firewall product is enabled, what security products are enabled, and the like. Integrity information may further include information associated with which processes are currently executing on the client device. Integrity information may also include version information associated with a selected application, process, operating system, and the like. The component may also gather information associated with a sequence of system calls that may indicate that the client device is suspect. Integrity information, however, is not limited to the above, and virtually any information, sequence of events, conditions, and the like, may be collected to determine the integrity of the client device.

Process 300 next proceeds to block 308, where the gathered integrity information is forwarded to the integrity manager, which may reside on a server, such as RIM 108 of FIG. 1. The forwarded information may be compressed, encrypted, and the like. The forwarded information may also be packaged and sent as a single transmission, or even over several transmissions.

The process continues to decision block 310, where a determination is made whether integrity information needs to be updated. An update of the information may be based on virtually any event, condition, criteria, and the like. For example, an update may be scheduled periodically, randomly, based on a predetermined sequence of system calls, based on a modification to a predetermined table, file, and the like. In any event, if it is determined that an update to the integrity information is to be performed, processing branches back to block 306, to perform actions as described above. Otherwise, processing proceeds to decision block 312.

At decision block 312, a determination is made whether the connection with the client device is terminated. Termination may arise for a variety of reasons, including, but not limited to, the applied policy determined that the integrity for the client device was insufficient, the client device was rebooted, logged off, and the like. In any event, if the connection is not terminated, processing loops back to decision block 310, above; otherwise, processing returns to a calling process to perform other actions.

Back at decision block 302, if it was determined that a component can not be downloaded to the client device, processing proceeded to block 314. At block 314, an attempt is made to obtain integrity information from the client device using another mechanism. In one embodiment, a request is sent to the client device, seeking selected integrity information. The request may also seek information associated with the connection with the client device, including, but not limited to, whether the connection is secure, over a virtual private network, employs certificates, and the like.

It is anticipated however, that a lesser level of information may be obtained through such requests to the client device. It is also feasible that an insufficient level of integrity information may be obtained. Thus, process 300 flows to decision block 316, where a determination is made whether a sufficient level of integrity information may be obtained through the request mechanism. If it is determined that the integrity information is insufficient, processing returns to the calling process to perform other actions; otherwise, processing branches to block 308, to proceed as described above, until the connection is terminated.

Figure 4:
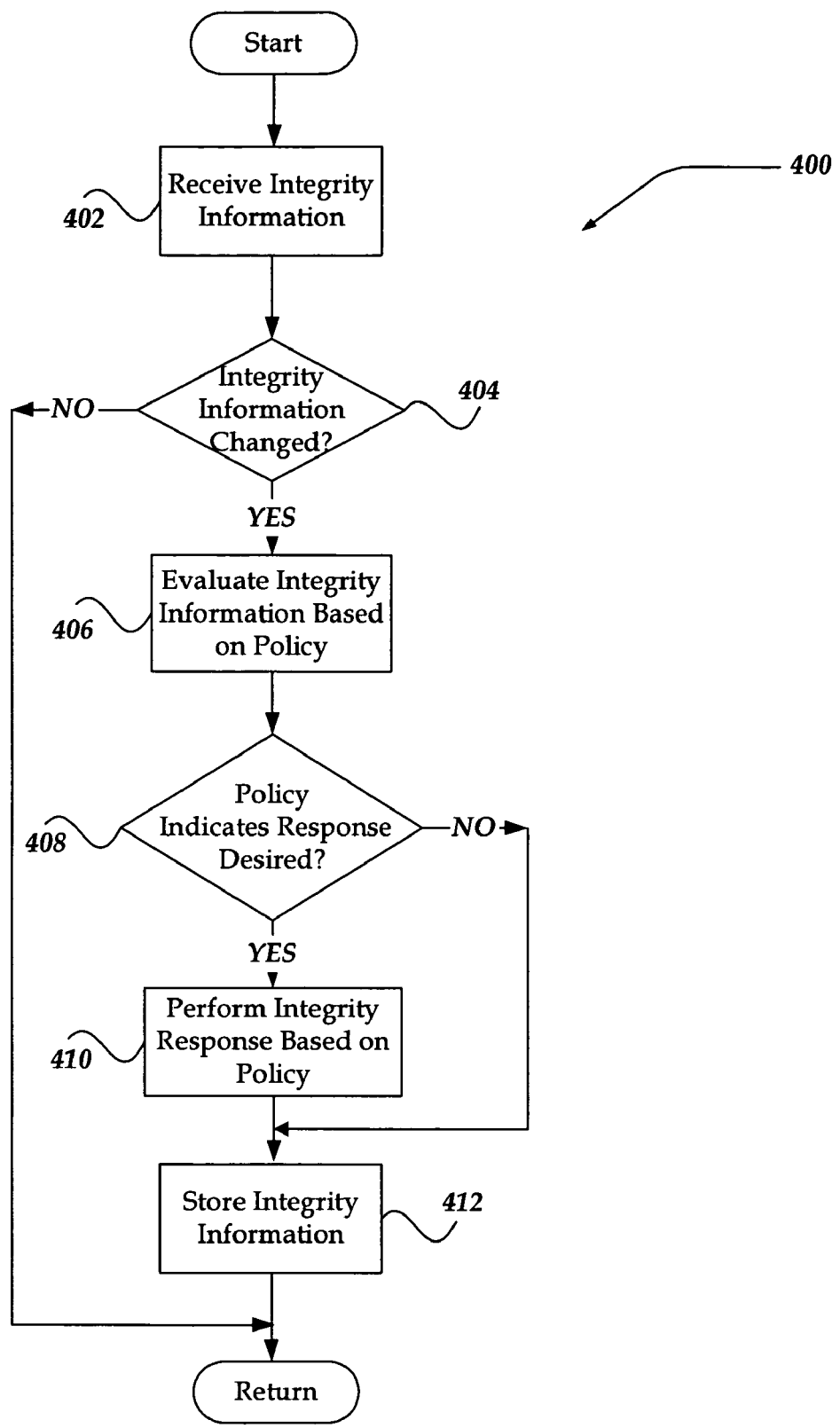
FIG. 4 illustrates one embodiment of a logical flow diagram generally showing one embodiment of a process for managing policy-based access to a resource based on the integrity information collected in FIG. 3, in accordance with the invention.

FIG. 4 illustrates one embodiment of a logical flow diagram generally showing one embodiment of a process for managing policy-based access to a resource based on integrity information associated with a client device. Process 400 may be implemented in RIM 108 of FIG. 1.

Process 400 begins, after a start block, at block 402, where integrity information for the client device is received. In one embodiment, the integrity information is received from block 308 of FIG. 3. Processing continues to decision block 404, where a determination is made whether the integrity information is changed from previously received integrity information for the client device. Typically, if this is the first time integrity information is received for this client device, it is assumed that the integrity information is different from previous integrity information. In another situation, however, integrity information associated with a prior connection for this client device may have been saved. In that instance, a comparison may be made between the currently received integrity information and the information saved from the previous connection. In any event, in one embodiment, if it is determined that the integrity information for the client device has changed, processing flows to block 406; otherwise, processing returns to a calling process to perform other actions.

In one embodiment (not illustrated in FIG. 4) processing flows to block 406 regardless of whether the integrity information has changed. It is possible that, although the integrity information has not changed, one or more factors, conditions, and the like, may have changed that might result in a problem with the client's integrity. For example, a policy might be changed or added while a connection is active, and the. The new or revised policy could then result in a different outcome with the same integrity information. In one another embodiment, evaluation of one or more policies may be affected by temporal factors, such as the length, in time, of a connection. For example, a policy might state that beyond a specified time period, a higher security level is required. In one still another embodiment, one or more factors, conditions, or the like, that are external to the connection could impact the evaluation of policies. For example, if it is determined that a server or a network is undergoing a security breach, an attempted security breach, or a suspicion of a security breach, a policy might be automatically added or changed, requiring a new evaluation of integrity information.

At block 406, one or more policies may be applied based, in part, on the received integrity information.

Another policy may be applied based on whether a modification has occurred to a predetermined file. For example, an applied policy may be to not trust a client device where its routing table was improperly modified. Similarly, the client device may not be trusted based on a predetermined minimum level of enabled security components, where a hacker tool is enabled on the client device, where a predetermined sequence of system calls were performed, where an antivirus product was enabled, but is no longer enabled, and the like.

Processing, flows next to decision block 408, where a determination is made whether the policy indicates a connection change or other action is desirable based on the integrity of the client device. If it does not, the process flows to block 412, where the received integrity information is stored. Processing then returns to the calling process to perform other actions.

If, at decision block 408, the policy does indicate a connection change or other action is desirable, an integrity response is performed based on the policy. The policy may include a variety of responses, including, but not limited to, terminating a connection with the client device, restricting access to a selected resource, denying access to another resource, and the like. For example, the policy may indicate that a connection shall be terminated if a hacker tool is enabled on the client device, where a predetermined sequence of system calls were detected, where an improper level of a security product is enabled, and the like. Similarly, the policy may indicate that where a predetermined file, such as a routing table, has been modified, a connection, such as a VPN tunnel connection, may be terminated. Policies may also indicate actions such as changing the client's ability to modify data. Upon completion of block 410, processing flows to block 412, where the received integrity information is stored. Processing then returns to the calling process to perform other actions.

In one embodiment, a policy may indicate providing the client with higher levels of capabilities, based on the integrity information. This may, for example, result from integrity information being provided that was not initially provided at the initiation of a connection. In one example, establishment of a connection may initiate a virus scan. An initial connection may be established based on a first level of client integrity. When the virus scan is complete, the completion of the virus scan may cause a positive change in the integrity information. This may then results in a higher level of capabilities for the client device, the connection, or the like. In another example, a client device may update software, resulting in higher integrity. Similarly, other changes to the client device or, the connection, or the like, may occur that result in an improvement in client integrity, and therefore a higher level of capabilities. Also, changes in integrity policies during a connection may result in higher capabilities.

Although not illustrated, the downloaded component may include sufficient intelligence to determine when to send an update of the integrity information to the integrity manager. Thus, in another embodiment of the invention, the downloaded component gathers integrity information and determines whether the information is different from previously gathered integrity information. If it is determined that the integrity information has changed, then the downloaded component is enabled to provide the changed integrity information to the integrity manager. In this manner, the amount of information communicated over the network may be minimized.

In one embodiment, a trusted device (not illustrated) may determine when to initiate an update of integrity information. The trusted device may monitor the client, monitor the network or a portion thereof, or monitor other devices, to make this determination.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus for managing access to a resource over a network, comprising:
    a transceiver arranged to receive a request for access to the resource from a client device; and
    an integrity management component, external to the client device, that is arranged to perform actions, including:
        providing a component to the client device;
        employing the component to gather integrity information associated with a configuration of the client device at a plurality of times;
        applying a dynamic policy for access to the resource based, in part, on forwarded integrity information; and
        if the applied policy indicates a change in an integrity of the client device, performing a response based, in part, on the applied policy.

2. The apparatus of claim 1, wherein the policy is manageable through a user interface at the apparatus.

3. The apparatus of claim 1, wherein the integrity information further comprises an indicator that at least one of an antivirus product is enabled on the client device, a network sniffer is enabled, a screen scraper is enabled, a cracker tool is enabled, a hacker tool is enabled, a firewall is enabled, a security application is enabled, and a client certificate is available on the client device.

4. The apparatus of claim 1, wherein the integrity information further comprises a version indicator associated with at least one of an application, a process, and an operating system.

5. The apparatus of claim 1, wherein the integrity information further comprises at least one of information associated with a process currently enabled on the client device, information associated with a sequence of system calls, and whether a predetermined file has been modified.

6. The apparatus of claim 1, wherein the integrity information is gathered at a predetermined rate comprising at least one of a periodic rate, a random rate, and an aperiodic rate.

7. The apparatus of claim 1, further comprising:
    sending a query request to the client device for selected information about the integrity of the client device.

8. The apparatus of claim 1, wherein the forwarded integrity information comprises at least one of compressed or encrypted integrity information.

9. The apparatus of claim 1, wherein the performed response further comprises at least one of denying access to the resource, terminating a connection, and restricting access to the resource.

10. The apparatus of claim 1, wherein the performed response further comprises providing a higher level of access to the resource.

11. The apparatus of claim 1, wherein at least some of the integrity information is gathered in response to a predetermined event.

12. A method of managing access to a resource over a network, comprising:
    receiving a request for access to the resource from a client device;
    receiving a first integrity information associated with a configuration of the client device;
    evaluating one or more policies for access based, in part, on the first integrity information;
    receiving a second integrity information associated with the client device;
    evaluating one or more policies for access based, in part, on the second integrity information; and
    performing a response external to the based, in part, on a difference between the first integrity information and the second integrity information.

13. The method of claim 12, wherein the performed response further comprises providing a higher level of access to the resource.

14. The method of claim 12, wherein the difference between the first integrity information and the second integrity information further comprises a change in antivirus security.

15. The method of claim 12, wherein the difference between the first integrity information and the second integrity information further comprises a change in a software configuration.

16. The method of claim 12, further comprising:
    sending a request for the second integrity information to the client device, based, in part, on an event external to the client device.

17. The method of claim 12, wherein the performed response further comprises maintaining a connection with the client device and providing a lower level of access to the resource.

18. A method of managing access to a resource over a network, comprising:

receiving a request for access to the resource from a client device;

receiving a first integrity information associated with a configuration of the client device at a first time;

receiving a second integrity information associated with the client device at a second time; and performing a response based, in part, on a difference between the first integrity information and the second integrity information.

19. The method of claim 18, wherein the first time and second time further comprises a time difference that is selected from at least one of a periodic rate, a random rate, and an aperiodic rate.

20. The method of claim 18, wherein the first integrity information and the second integrity information further comprises an indicator that at least one of an antivirus product is enabled on the client device, that a network sniffer is enabled, a screen scraper is enabled, a cracker tool is enabled, a hacker tool is enabled, a firewall is enabled, a security application is enabled, and an indicator that the client device is enabled for a client certificate.

21. The method of claim 18, wherein the first integrity information and the second integrity information further comprises a version indicator associated with at least one of an application, a process, and an operating system.

22. The method of claim 18, wherein the performed response further comprises providing a higher level of access to the resource.

23. The method of claim 18, wherein the performed response further comprises restricting access to the resource.

24. The method of claim 18, wherein the difference between the first integrity information and the second integrity information further comprises a change in a security configuration.

25. A system for managing access to a resource over a network, comprising:

a client device configured to request access to the resource; and a server, coupled to the client device, that is configured to perform actions, including:

receiving the request for access from a client device;

providing a component to the client device;

employing the component to gather integrity information associated with a configuration of the client device, wherein the integrity information is gathered at a predetermined rate;

receiving the integrity information at the predetermined rate from the component;

applying a dynamic policy for access based, in part, on the forwarded integrity information; and if the applied policy indicates a change in an integrity of the client device, performing a response based, in part, on the applied policy.

26. The system of claim 25, wherein the integrity information further comprises at least one of information associated with a process currently executing on the client device, information associated with a sequence of system calls, and information indicating whether a predetermined file has been modified.

27. The system of claim 25, wherein the predetermined rate further comprises at least one of a periodic rate, a random rate, an aperiodic rate, and being based on a predetermined event.

28. A computer-readable storage medium having a modulated data signal stored thereon for managing access to a resource over a network, the modulated data signal operable to perform the actions of:

sending, from a client device, a request for access to the resource;

receiving, by a server, the request for access;

providing a component to the client device;

forwarding, towards the server, integrity information associated with a configuration of the client device, wherein the integrity information is forwarded at a predetermined rate;

applying a dynamic policy for access to the resource based, in part, on the forwarded integrity information; and if the applied policy indicates a change in an integrity of the client device, performing a response based, in part, on the applied policy.

29. The computer-readable storage medium of claim 28, wherein the modulated data signal is further operable to perform the action of sending a query request to the client device for selected information about the integrity of the client device.

30. The computer-readable storage medium of claim 28 wherein the predetermined rate further comprises at least one of a periodic rate, a random rate, an aperiodic rate, and a rate based on a predetermined event.

* * * * *